Jan. 13, 1959   J. B. MYERS   2,868,735
METHOD OF PROCESSING VERMICULITE
Filed July 8, 1955
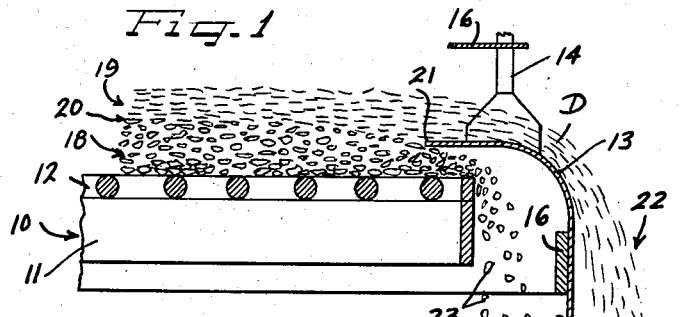
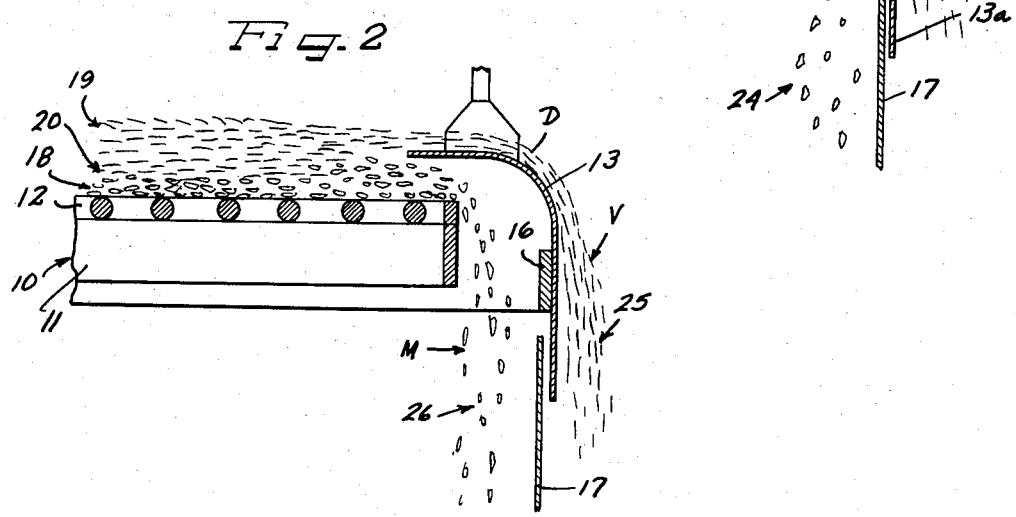
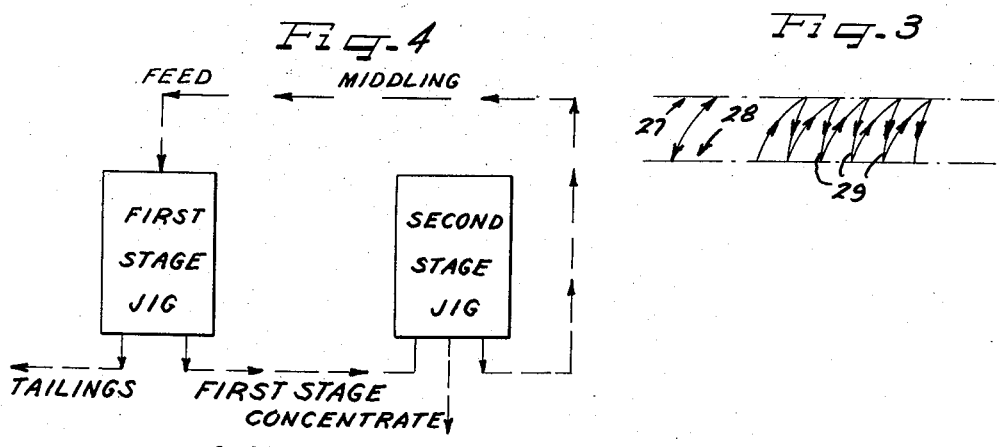
Inventor
JOHN B. MYERS
by Hill, Sherman, Meroni, Gross & Simpson
Attys.

United States Patent Office 2,868,735
Patented Jan. 13, 1959

2,868,735

METHOD OF PROCESSING VERMICULITE

John B. Myers, Libby, Mont., assignor to Zonolite Company, Chicago, Ill., a corporation of Montana Application July 8, 1955, Serial No. 520,752

7 Claims. (Cl. 252—378)

This invention relates to a process of treating vermiculite ores, and particularly to a new and improved process for producing greatly increased volume yields of exfoliated vermiculite from vermiculite ore.

The minerals that are generically termed "vermiculites," while having somewhat different properties, all have the general characteristic in that they will expand upon heating. This expansion of vermiculite is termed exfoliation because the expansion may be said to resemble the separation of the leaves of a book.

The heat-expandable mineral vermiculites from which expanded vermiculite is obtained are composed mainly of hydrous magnesium aluminum iron silicates. The crystal structure of the mineral is of the laminated type, being built of sheets or layers and displaying pronounced basal cleavage.

Vermiculites, as mined, are generally brown to black materials and vary in composition. Most commercial materials are believed to be intermediate in composition between theoretically pure vermiculite and biotite. One theory is that the crystal structure of the mineral is composed of intermixed layers of vermiculite and biotite in various but regular proportions.

Although it has not been fully substantiated, workers in the art believe that the laminae of vermiculite are separated by layers of water molecules, some workers estimating that about 16 million such layers may be contained per inch of the mineral. These layers of water molecules between the laminae are believed to be water of crystallization molecules and/or unbound water which is occluded within the laminated crystal structure. It is further believed that these layers of water give rise to the unusual expansive properties of vermiculite when exposed to elevated temperatures. This view, if correct, would explain the phenomenon that vermiculite always exfoliates or expands in a direction perpendicular to the cleavage planes.

When subjected to temperatures in excess of 300° F. vermiculite expands or exfoliates perpendicularly to the cleavage planes of the crystal. By merely subjecting the laminated, flake-like vermiculite to elevated temperatures it is possible to increase the bulk volume of the material 8 to 12 times. This light-weight material is the expanded or exfoliated vermiculite of commerce which is used for many purposes. Its characteristics are light weight, fireproofness, thermo-insulation and high liquid absorptivity. Because of its fireproof nature, it is used extensively as a light weight aggregate in plaster, concrete and other cementitious materials. In addition to being light weight and fireproof, exfoliated vermiculite is also a good sound absorbent material and is used in acoustical plaster and tile. It is widely used as a loose fill insulation in the walls and ceilings of buildings.

Vermiculite deposits very rarely occur in pure masses, but rather, are intermixed with varying amounts of gangue minerals. Accordingly, the ore must be beneficiated, by removing the impurities therefrom and drying before the material can be properly subjected to heat treating to produce exfoliation. In the methods employed heretofore this refining was effected by first drying the surface moisture of the ore as mined, screening the ore into various sizes, and removing the impurities therefrom by various concentrating methods which were largely dry processes. The dried vermiculite concentrates thus produced by the conventional prior methods were exfoliated in a vertical type furnace in which the mineral was quickly heated. These methods resulted in an exfoliated product in which there was an increase in volume of from about 8 to 12 times that of the vermiculite concentrates used as starting material.

The tariff rates for shipping exfoliated vermiculite are based upon a high charge per pound because a low density material occupies a large shipping space in proportion to its weight. It is therefore commercially prohibitive to ship it long distances. Accordingly, the economics of the use of vermiculite is based largely upon concentrating the ore at the mine and shipping the heavy unexpanded nearly pure mineral to the area in which it is to be used. The concentrated vermiculite is then heat treated and expanded at the place where the expanded vermiculite is to be used.

For substantially all of the uses of expanded or exfoliated vermiculite, it is highly desirable to have a product that is as light weight as possible; for, the lighter the weight of the expanded material, the greater is its insulating ability. Accordingly, then, it is quite important economically to realize as great a volume of exfoliated vermiculite as possible from each ton of concentrate prepared at the mines. This concept is generally expressed as the volume-yield or yield in cubic feet per ton. Another significant factor which makes this volume-yield important is the cost of transportation of the concentrates between the mine and the location of the expanding plant. Indeed, at present, the average transportation cost between the producing mines and the areas of consumption, that is, the location of the expanding plant—is often greater than the average market value of the prepared vermiculite concentrates at the mine shipping points. As may be readily seen, and appreciated, this is not the most desirable economic situation.

Because of the pressing demands for greater volume-yields of exfoliated vermiculite from the ore concentrates, a number of attempts have been made heretofore to increase the bulk volume of the exfoliated mineral. All of these prior methods aimed primarily at increasing the mineral bulk by improving or modifying the heating process. The commonly used, commercially practicable method for exfoliating vermiculite minerals to date is by a direct heating treatment in vertical furnaces wherein the vermiculite concentrate is heated by a counter-current flow of a heated gas. The extent of exfoliation is determined by the time-temperature relationship established by the internal design of the furnace. Commercial furnaces are set to produce the maximum yield for any specific type or size of vermiculite concentrate.

One attempt to increase the volume yield was to subject the mineral to greatly increased temperature conditions. These increased temperatures, alone, however, yielded insignificant increases in the bulk volume of the expanded mineral.

Another attempt at improving vermiculite expansion was to exfoliate the vermiculite concentrates in a furnace with an increased period of time in the heating cycle. It was found that prolonged heating did not materially affect the volume yield.

I have now found that increased volume-yields of exfoliated vermiculite can be produced from laminated vermiculite ores by a simple procedure. I have found that the extent of exfoliation of vermiculite within the preferred time-temperature range is dependent upon the thickness of the particles of the vermiculite concentrate prior to heating. The extent of expansion of a vermiculite particle or "flake" within the preferred range of exfoliation temperatures is primarily dependent upon the starting thickness of the flake. That is, the number of laminations comprising the thickness of the particle controls the extent of expansion at any given heat or temperature employed. Accordingly, I have found that if vermiculite concentrates are "partially delaminated" prior to any drying or heating to exfoliation temperatures, volume-yields of the thereafter expanded material which can be realized, greatly exceed those obtainable by methods employed heretofore. By "partial delamination" is meant the separating or splitting of a vermiculite flake or particle along one or more of the cleavage planes to reduce the thickness of the particle.

I have further found that delamination of vermiculite ore can only be advantageously and satisfactorily achieved when the ore still contains substantially the same amount of moisture as it has naturally at the time it is mined. Apparently, that amount of moisture which is normally contained in the ore—usually about 2% to 12%—in the as-mined condition, weakens the bond between the laminae of the ore and facilitates delamination. If the ore is dehydrated, or dried, as has been the practice heretofore, prior to attempting delamination, the effectiveness of delamination of the material is materially reduced. It would thus appear that drying the mineral strengthens the bonds between the laminae.

By the process of the instant invention wherein the vermiculite ore is delaminated after being mined and before being dried and/or subjected to heat to effect exfoliation, it is possible to realize volume-yields as great as from 20 to 30% higher than those yields which have been obtained by methods employed heretofore.

In accordance with the foregoing, then, an object of this invention is to provide a new and improved process for producing a partially delaminated vermiculite concentrate capable of giving greatly increased volume-yields of exfoliated vermiculite.

Another object is to provide an improved method for producing exfoliated vermiculite which comprises partially delaminating the vermiculite ores from whence the vermiculite concentrate is obtained prior to drying and exfoliating said vermiculite concentrate.

A further object is to provide a process for producing increased volume-yields of exfoliated vermiculite from ore concentrates wherein said ore is subjected to mechanical agitation in an aqueous slurry to effect partial delamination of the vermiculite particles.

Still another object is to provide a method for producing increased volume-yields of exfoliated vermiculite by subjecting the ore as mined, while the bonds holding the laminae of the vermiculite together are weak, to a delamination treatment prior to drying or subjecting said ore to the action of heat.

Other objects and advantages will be apparent to those skilled in the art from the following disclosure and discussion of the attached sheet of drawings which illustrate one system which may be employed to achieve the benefits of the invention.

In the drawings:

Figure 1 is an enlarged fragmentary and somewhat diagrammatic view, with parts in section, of the moving tray deck of a modified Hancock jig employed in the first stage of partially delaminating vermiculite ore in accordance with the method of the instant invention;

Figure 2 is a view similar to Figure 1 showing the moving tray deck of a modified Hancock jig employed in a second or later stage of partially delaminating vermiculite ore in accordance with the method of the instant invention;

Figure 3 is a diagrammatic view illustrating the movement of the jig tray deck and the movement of the ore particles as employed in partially delaminating vermiculite ore with a modified Hancock jig;

Figure 4 is a diagrammatic flow sheet illustrating the sequence of steps employed in partially delaminating and beneficiating vermiculite ore in accordance with the method of the instant invention.

In accordance with the instant invention vermiculite taken directly from the mineral deposit and still containing its original natural moisture content is partially delaminated or separated into thinner flakes prior to drying the material. As noted previously, partial delamination should be carried out prior to drying, for drying tends to increase the cohesive bond between the laminations, making delamination much more difficult or impossible.

The delamination may be effected in any one of a number of different ways, the exact procedure not being important so long as partial delamination is achieved. One method which may be advantageously employed in delaminating the ore is to mechanically agitate an aqueous slurry of the ore in a manner to cause a sufficient amount of collision between the particles. This agitation in water must take place while the cohesive bond within the flake is weak, that is, reasonably soon after the ore is mined and prior to drying. After the material has been agitated in water to effect delamination, it is preferably dried in order to prepare it for subsequent exfoliation. After drying, however, it is no longer possible to cause any great amount of delamination by further wetting and agitation. The above described delamination of the vermiculite ore in a thick aqueous slurry by mechanical agitation may occur contemporaneously or simultaneously with a process for beneficiating the ore—that is, the delamination can be achieved in the same step as the process for removing gangue impurities. One such method of accomplishing this is in a concentrating device such as a Hancock jig type which causes sufficient agitation and collision of the vermiculite flakes so as to effect the desired amount of delamination.

The apparatus shown in Figures 1 and 2 comprises the delivery end of a tray deck of a Hancock-type jig, which is well known to those versed in the mining art. The tray deck shown in Figures 1 and 2, however, has been modified so that this form of jig can be efficiently and conveniently employed in contemporaneously effecting a partial delamination of as-mined vermiculite ore and also a removal of some of the gangue and other non-vermiculite contaminant materials therefrom. It will be understood by those familiar with the art of jigging that the tray deck shown in Figures 1 and 2 is submerged in a tank of water which forms the external structure of the jig which is not shown. The level of the water is kept above the layer of ore on the tray deck so as to allow free movement of the ore.

The jig structure, referred to generally by the reference numeral 10, consists of a rectangular frame 11 and a tray deck 12, which is composed of wedge wire screen. A vertically adjustable, arcuately shaped cutter plate 13 is mounted on the delivery end D of the tray 10 by means of a vertically adjustable supporting bracket 14. The bracket 14, in turn, is mounted on a transverse support member 16 which is attached to the jig structure 10 by the sides of the tray, which are not shown. The cutter plate 13 is of a sufficient size to extend transversely across the entire width of the tray deck 12 and continues downwardly to provide a vertical lip 13a.

An apron 17 is fixedly mounted inwardly of and adjacent the lower lip 13a of the plate 13 to form in effect, an extension thereof. The function of the apron 17 will be more fully explained hereinafter.

The method and manner in which the jig apparatus shown in Figures 1 and 2 operates to partially delaminate and beneficiate the as-mined vermiculite ore, will be better appreciated if the description to follow is read in connection with the flow sheet shown in Figure 4.

In operation, the as-mined vermiculite is continuously fed in the form of an aqueous slurry onto the tray deck 12, at the end opposite the delivery end D.

The vermiculite ore in its as-mined state contains substantially the same percentage of water bonded between the laminae as it does in its natural unmined state. The vermiculite ore befort it is delivered to the jig is admixed with a sufficient amount of water to produce an aqueous vermiculite slurry of any desired fluidity.

The fluidity of the aqueous vermiculite slurry plus the alternate expansion and compaction of the ore by the up and down motion of the tray deck 12 causes the vermiculite ore slurry deposited thereon to separate into various strata. These strata comprise a lower layer, shown generally at 18 in Figure 1, which consists mostly of gangue, and other similar heavy non-vermiculite contaminant material. The higher density of these impurities causes them to settle to the tray deck bed faster than the vermiculite. The upper stratum, shown generally at 19, comprises primarily lightweight flakes of substantially pure vermiculite. The flake thickness of the individual vermiculite particles present in the upper stratum 19 varies between the upper surface of the stratum 19 and the gangue-vermiculite interface, indicated generally at 20. That is, the lightest or thinnest vermiculite flakes predominate, naturally, near the top surface of the stratum 19, while the heavier or thicker flake particles are present at or near the gangue-vermiculite interface 20. As the vermiculite ore is moved toward the delivery end D of the jig under the influence of the rocking motion of the jig (which will be more clearly explained with reference to Figure 3) the impurities become more concentrated near the tray deck bed 12 while the lighter or thinner flake particles are concentrated primarily in the upper stratum 19. The rocking movement of the jig 10 causes the bed of vermiculite to alternately expand or swell and be compacted, resulting in a continuous movement or agitation of the vermiculite slurry which imparts sufficient collision impact and mechanical shock to the individual particles in the stratum 19 to cause partial delamination of such particles.

The cutter plate 13 controls the separation of the lighter-weight, pure vermiculite particles in the stratum 19 from the gangue and other impurities in the layer 18. As seen in Figure 1 the leading edge 21 of the cutter plate 13 is positioned just below the interface 20 between the vermiculite in layer 19 and the impurities in layer 18. Accordingly, as the vermiculite slurry moves toward the delivery end D a major portion of pure vermiculite particles and a minor portion of impurities will be delivered to and over the arcuate cuter plate, as at 22, to a suitable conveyor means (not shown). It is thus obvious that the ratio of pure vermiculite to impurities which is delivered over the cutter plate 13 will be largely determined by the position of the leading edge 21 of the cutter plate 13. The position of the leading edge 21, in turn, is controlled by vertically adjusting the cutter plate 13 on the mounting bracket 14.

The gangue and other impurities in layer 18 pass under the cutter plate 13 as tailings 23 in a separate stream 24. The intermingling of the pure, partially delaminated vermiculite slurry as at 22 with the gangue particles in the stream 23 is prevented by the fixed apron 17, which effectively separates the two. The gangue or tailings 23 discharged in the stream 24 is delivered to a suitable conveying means and discarded as waste.

The partially delaminated vermiculite delivered from the first stage pig in Figure 1 at 22 is referred to as the "first stage concentrate." This first stage concentrate is delivered by suitable conveyor means to a second stage jig shown in Figure 2. As seen therein, the jig structure is substantially identical to the jig structure of Figure 1; with similar parts being labeled with similar reference numbers. The first stage concentrate from the first stage jig of Figure 1 is deposited as a slurry on the feed end of the tray deck 12 opposite the delivery end D. The rocking motion of the tray deck 12 causes the vermiculite particles to be further partially delaminated and also causes the small amount of gangue or impurities contained in the ore to be compacted against the tray deck 12. By the time the slurry has reached the delivery end of the second stage jig, the upper stratum of the material is substantially pure, partially delaminated vermiculite.

The cutter plate 13 of the second stage jig is vertically adjusted so that the leading edge 21 thereof is positioned in the vermiculite layer 19 substantially above the vermiculite-gangue interface 20. This insures the delivery of substantially pure vermiculite concentrate V over the cutter plate 13, as at 25. The particles of gangue and other impurities in layer 18 are discharged as middling M under the cutter plate 13 in a stream 26. This middling M which passes under the cutter plate 13 comprises gangue and other impurities plus a portion of vermiculite particles. The depending skirt 17 performs the same separating function as described in Figure 1.

The pure, partially delaminated vermiculite particles V delivered over the cutter plate 13 in Figure 2 is known as the "second stage concentrates." This material is subsequently dried at temperatures below those at which exfoliation takes place, preferably below 300° F., for shipment to points at which the material is to be exfoliated. It is there exfoliated by heating in the usual manner and at temperatures of 300° F. and above, preferably at 1400° to 2000° F.

The middling material M is delivered as the stream 26 to suitable conveying means and conveyed back to the first stage jig shown in Figure 1. The middling M is recirculated through the system to assure the removal of the maximum amount of vermiculite ore. In this manner, substantially all the vermiculite is contemporaneously partially delaminated and removed from the gangue, which is discarded as tailings. It is also significant that the vermiculite particles in middling M are those nearest to the vermiculite-gangue interface 20 and are therefore the heaviest and thickest. These particles need further handling to cause a greater amount of delamination. The two stage jigging process and the middling return circuit automatically assures that the thick flakes will receive subsequent agitation and delamination.

The rocking motion of the tray deck 12 which effects the contemporaneous partial delamination of the vermiculite flakes and removal of gangue is shown diagrammatically in Figure 3. The operation of the jig is such that the tray moves up and down with a slight forward motion which conveys the material along the tray deck 12 toward the delivery end D. This is done by means of a suitable cam mechanism (not shown), which is actuated through suitable mechanical means. The cam mechanism produces a particular kind of stroke in the movable tray. The cam raises the tray slower than the tray drops when it is free. The result is a differential motion which is a slow upstroke as at 27 (Fig. 3) and a rapid downstroke, as at 28, this motion of the tray deck causes the bed of ore to advance along the deck in a series of jumps 29 illustrated in Fig. 3. The flow or movement of the vermiculite slurry is adjusted so that the material passes along the jig bed at the proper speed for correct separation at an adequate capacity. This motion on each stroke of the jig causes the bed of the vermiculite slurry to dilate as the tray deck is being dropped and to compact it as it is being raised. This oscillatory motion also causes the heavier gangue fraction or impurities to settle near the tray deck bed while the lighter or purer vermiculite flakes remain in the upper stratum. It may also be noted here that this type of stroke action or motion causes the thick flakes of vermiculite to collect near the interface between the vermiculite and the gangue where they will be recirculated until they are thin enough to report in the upper stratum.

Another method of concentrating vermiculite ore which will simultaneously cause substantial delamination of the vermiculite is the "heavy-media" or "sink-float" process. This is another standard process well known to those familiar with the mineral dressing arts. The process employs a vessel containing a mixture of water and a heavy mineral such as magnetite or ferrosilicon which acts as a liquid whose density is adjusted to be intermediate between the gangue and the mineral to be recovered. The less dense minerals float to the surface and the heavy minerals sink to the bottom, thus effecting a separation. The ore is screened and washed before entering the separatory vessel and the products are washed on a screen after separation to remove the heavy medium. It is this series of scrubbing, agitation, washing and handling of the vermiculite that causes delamination.

A third example of combined delamination and beneficiation is a process used on high grade vermiculite ores that do not require the removal of gangue but only have to be washed free of clay and fine sized ore particles. In this process the ore is broken up in a hammer mill crusher and combined with water to form a slurry. This slurry is pumped to a mechanical classifier such as a spiral classifier or a rake classifier wherein the vermiculite is recovered from the water which carries the clay and fines. The action of these processes on the freshly mined vermiculite in an aqueous slurry causes substantial delamination of the vermiculite flakes which is the object of this invention.

It will be obvious to those skilled in the art of beneficiating ores that other methods of concentrating vermiculite ore could be used to simultaneously delaminate the vermiculite flakes provided that the process acted upon the ore before the naturally occuring bond between the vermiculite laminations had been altered by drying and provided the process acted upon the ore in a wet mass of material with sufficient mechanical handling to cause enough flakes to separate to materially effect the volume-yield upon exfoliation.

The increase in volume-yield realized from vermiculite which has been partially delaminated by means such as described above, prior to exfoliation is due solely to the decrease in the average flake thickness. The thickness of an unexpanded particle and the thickness of an exfoliated or expanded particle may be expressed as the "ratio of expansion."

In determining this ratio, the thickness of a number of individual flakes of vermiculite ore is first measured with a micrometer prior to exfoliation to get what may be termed an average thickness. The flakes are then expanded by subjecting the same to a temperature within the range of from about 1400 to 2000° F. A reasonable number of the resulting expanded particles is then again measured with the micrometer at right angles to the cleavage plane, which, as noted before, is the only direction is which vermiculite expands. The ratio of the average thickness of the unexpanded particles to that of the expanded particles may be expressed as the ratio of expansion. I have found that there is a definite relation between this ratio of expansion and initial flake thickness at the start of the heat treatment—namely, the thinner the flake, the higher the ratio of expansion; the relationship being inversely proportional and a straight line function. Mathematically this relationship may be expressed by the formula: $Y = 43 - 367X$; where Y equals the ratio of expansion and X equals the flake thickness in inches. When this equation is plotted, the resulting straight line graph does not represent an absolute mathematical ratio for every particle, but rather merely represents a statistical trend line. Accordingly, although the exact amount of expansion of a vermiculite flake cannot be accurately predicted, a fair indication of the expansion ratio of the particle may, nevertheless, be ascertained. This phenomenon of expansion ratio is substantially independent of the temperature at which the exfoliation is affected within the range of from about 1400° F to 2000° F.

In developing this formula several hundred samples of different thicknesses of vermiculite ore were tested at various temperatures and the results plotted. This trend curve is the statistical average of these experiments. Due to variations in the chemical composition of individual vermiculite particles, any given particle may fall above or below the trend line. It is significant, however, that if an individual flake or particle of the vermiculite mineral is separated into a plurality of thicknesses, the ratio of expansion of the individual separated pieces when expanded will establish a trend line of a similar slope. It is to be noted that this trend line is so steep that any significant change in the average thickness of a mass of vermiculite flakes will necessarily materially change the resulting volume-yield.

For example, a sample of unexpanded vermiculite wherein all of the flakes are 0.075 inch in thickness and of a constant diameter will have less than half the yield of a similar sample of flakes of the same diameter having a thickness of only 0.015 inch. In other words, a given weight unit of the thinner flake material will give twice the volume-yield of the same weight unit of the thicker flake material with all other dimensions and conditions remaining the same.

In the presently used commercial processes for producing exfoliated vermiculite large increases in yield due to the use of thin flake ore concentrate particles are not possible. Present methods do not delaminate the ore prior to exfoliation. The average flake thickness of present commercially prepared vermiculite ore concentrates is predominantly in the range of from about 0.01 inch to 0.04 inch in thickness. In the large mesh sizes, such as those used for fill insulation, there is an even higher proportion of thicker flakes in the thickness range of from about 0.04 to 0.08 inch, with occasional flakes being even thicker. These non-delaminated, thick vermiculite flakes or particles give lower-volume-yields per weight unit than do thinner flakes.

The following specific examples given by way of illustration only, more clearly describe the process of the instant invention.

*Example I*

About 50 tons of typical average vermiculite ore were screened on a wet screen to a particle size of between ⅜ inch and 8 mesh and concentrated in a Hancock jig. This wet screening and jigging provided sufficient agitation to partially delaminate the vermiculite flakes. The resulting vermiculite concentrate was then dried and further refined to make it conform to standard specifications as to screen size, moisture content and rock content. This product was thereafter exfoliated in a standard commercial exfoliating furnace. This specially prepared, delaminated vermiculite concentrate yielded 384 cubic feet of exfoliated vermiculite per ton of ore. The same ore when processed by existing methods and utilizing conventional means, and which was not delaminated prior to drying, yielded only 312 cubic feet of exfoliated vermiculite per ton of ore. The increase in yield due to this new process utilizing preliminary delamination was about 23%.

In order to more clearly illustrate the process on a quantitative basis, the folowing laboratory tests and measurements were conducted:

*Example II*

A representative sample was taken from a number of vermiculite ores which had been prepared by the delamination process of the instant invention and from ores prepared by standard non-delaminating processes employed heretofore. Each sample was screened through a standard 3-mesh laboratory test screen and on a 4 mesh test screen. These closely sized samples were further reduced in bulk by standard sampling methods. Exactly 100 flakes of each material—that is, the delaminated and non-delaminated—were then individually measured by means of a micrometer. The average thickness of the delaminated material by the present process was 0.023 inch. The average thickness of the conventionally processed, non-delaminated material was 0.044 inch. The 0.023 inch thickness of the delaminated material gave a calculated ratio of expansion of 34.5 according to the trend formula set out above. The thickness of the non-delaminated 0.044 inch material give a calculated ratio of expansion of 26.8. This amounted to an increase in the ratio of expansion of 28.7% due to reduced flake thickness. As noted previously, the full scale commercial test previously described had an increase in yield of about 23%. These data would appear to give excellent confirmation of the principle of the process and to exemplify the results to be obtained from the process.

It will be apparent to those skilled in the art that I have now provided a new, improved and novel process for increasing the total volume-yield which may be realized from vermiculite ore. It will be obvious that this increase in the total bulk of exfoliated vermiculite increases the economic feasibility of shipping the vermiculite ore concentrates from the mine after partial delamination to the areas of use where the concentrates may be expanded, and there obtain a total increase of from about 10 to 30% over the methods employed heretofore.

It will be apparent to those skilled in the art that variations and modifications may be made in the instant invention without departing from the scope thereof.

I claim as my invention:

1. In the process of producing exfoliated vermiculite from a micaceous ore, the improvement which comprises mechanically agitating an aqueous slurry of said ore in substantially its as-mined state while said ore still contains its natural moisture content to contemporaneously effect delamination and concentration of said ore and to remove impurities therefrom prior to drying and exfoliating said ore.

2. A process for producing increased volume-yields of exfoliated vermiculite from a laminated micaceous vermiculite ore capable of being exfoliated by the action of heat, which comprises subjecting an aqueous slurry of said ore while said ore is in its as-mined condition to a first oscillatory mechanical agitation whereby the vermiculite particles in said slurry are partially delaminated and are concentrated as a layer primarily in the upper portion of said slurry while the gangue in said ore is concentrated as a layer primarily in the lower portion of said slurry, separating said upper vermiculite layer from said lower gangue layer, discarding the lower gangue layer, subjecting the vermiculite layer thus removed to a second oscillatory mechanical agitation whereby said vermiculite particles are further partially delaminated and are again concentrated as a layer in the upper portion of said slurry while any gangue in said slurry is concentrated as a layer in the lower portion thereof, both of said agitations being carried out while said ore still has its natural moisture content, separating a major portion of said upper layer from said slurry as pure vermiculite, resubmitting the remaining gangue and minor portion of vermiculite to the said first oscillatory mechanical agitation, drying the partially delaminated pure vermiculite separated from said second mechanical agitation, and heating said dried partially delaminated vermiculite at elevated temperatures to effect exfoliation thereof.

3. In a method for producing increased volume-yields of exfoliated vermiculite from vermiculite ores, the improvement which comprises subjecting an aqueous slurry of said ore while said ore is in its as-mined condition to a plurality of stagewise mechanical vibrations while said ore still contains its natural moisture content whereby the vermiculite in said ore is contemporaneously partially delaminated and separated into a distinct layer from the gangue present in said ore slurry thus allowing said partially delaminated vermiculite to be removed as relatively pure particles from said slurry.

4. In a method of preparing vermiculite ore for exfoliation by heating, the improvement whereby an increased ratio of expansion is obtained as compared with drying and screening of the as-mined ore followed by exfoliation, said improvement comprising subjecting an aqueous slurry of the as-mined ore without prior drying thereof to a vibratory separating action to effect both a beneficiation of the ore and a partial delamination thereof in a wet state prior to any drying, dry screening and exfoliating thereof by the application of heat thereto.

5. A process for increasing the volume yield of exfoliated vermiculite contained in a vermiculite-bearing ore which comprises dispersing particles of said ore in the as-mined condition in an aqueous medium to form a slurry, agitating the resulting slurry to effect delamination of the vermiculite particles, and thereafter heating the delaminated vermiculite particles to exfoliate the same.

6. A process for increasing the volume yield of exfoliated vermiculite contained in a vermiculite-bearing ore which comprises dispersing particles of said ore in the as-mined condition in an aqueous medium to form a slurry, agitating the resulting slurry to effect delamination of the vermiculite particles, drying the delaminated vermiculite particles at a temperature below the exfoliation temperature, and subsequently heating the dried particles to an exfoliating temperature.

7. A process for increasing the volume yield of exfoliated vermiculite contained in a vermiculite-bearing ore which comprises dispersing particles of said ore in the as-mined condition in an aqueous medium to form a slurry, alternately expanding and contracting said slurry to effect delamination of the vermiculite particles, drying the delaminated particles at a temperature below the exfoliation temperature, and subsequently heating the dried particles to an exfoliating temperature.

References Cited in the file of this patent

UNITED STATES PATENTS 2,139,358    Ericson _____ Dec. 6, 1938

FOREIGN PATENTS 459,700    Canada _____ Feb. 22, 1949